US012801077B2

(12) United States Patent
Ohmori et al.

(10) Patent No.: US 12,801,077 B2
(45) Date of Patent: Nov. 17, 2026

(54) PROTECTIVE LAYER FORMING DEVICE AND IMAGE FORMING APPARATUS

(71) Applicants: Masahiro Ohmori, Kanagawa (JP); Keiichiro Juri, Tokyo (JP); Akio Kosuge, Kanagawa (JP); Yusuke Ishizuka, Kanagawa (JP); Kenji Komito, Tokyo (JP)

(72) Inventors: Masahiro Ohmori, Kanagawa (JP); Keiichiro Juri, Tokyo (JP); Akio Kosuge, Kanagawa (JP); Yusuke Ishizuka, Kanagawa (JP); Kenji Komito, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 19/231,573

(22) Filed: Jun. 9, 2025

(65) Prior Publication Data

US 2025/0383620 A1 Dec. 18, 2025

(30) Foreign Application Priority Data

Jun. 13, 2024 (JP) ................................ 2024-095858

(51) Int. Cl.
*G03G 21/00* (2006.01)
*C08G 18/32* (2006.01)
(Continued)

(52) U.S. Cl.
CPC ..... *G03G 21/0017* (2013.01); *C08G 18/3206* (2013.01); *C08G 18/3865* (2013.01);
(Continued)

(58) Field of Classification Search
CPC ........... G03G 15/2025; G03G 21/0017; G03G 21/0094; C08G 18/3206; C08G 18/3865;
(Continued)

(56) References Cited

U.S. PATENT DOCUMENTS

2009/0232541 A1 9/2009 Hatakeyama et al.
2009/0311014 A1 12/2009 Tanaka et al.
(Continued)

FOREIGN PATENT DOCUMENTS

JP 2009-222805 A 10/2009
JP 2009-300861 A 12/2009
(Continued)

OTHER PUBLICATIONS

U.S. Appl. No. 18/650,335, filed Apr. 30, 2024.
(Continued)

*Primary Examiner* — Joseph S Wong
(74) *Attorney, Agent, or Firm* — XSENSUS LLP

(57) ABSTRACT

A protective layer forming device includes lubricant including fatty acid metal salt and a lubricant application blade. The lubricant application blade includes a contact portion contacting a surface of an image bearer to apply the lubricant on the surface of the image bearer. The contact portion includes polyurethane elastomer that includes a reaction product of polytetramethylene ether glycol, aromatic isocyanate, and amine. The contact portion has a Martens hardness of 5.0 N/mm$^2$ or more and 30.0 N/mm$^2$ or less. The lubricant applied to the surface of the image bearer by the lubricant application blade has a normalized ionic strength A of a metal ion amount derived from the fatty acid metal salt, satisfying a following expression (1), $$1E{-}4 < A < 20E{-}4, \quad (1)$$

where the normalized ionic strength A is measured by a time-of-flight secondary ion mass spectrometer.

17 Claims, 3 Drawing Sheets

(51) Int. Cl.

| | |
|---|---|
| ***C08G 18/38*** | (2006.01) |
| ***C08G 18/48*** | (2006.01) |
| ***C08G 18/66*** | (2006.01) |
| ***C08G 18/76*** | (2006.01) |
| ***C10M 105/24*** | (2006.01) |
| ***C10N 40/14*** | (2006.01) |
| ***G03G 15/20*** | (2006.01) |

(52) U.S. Cl.
CPC ..... *C08G 18/4854* (2013.01); *C08G 18/6685* (2013.01); *C08G 18/7614* (2013.01); *C10M 105/24* (2013.01); *G03G 15/2025* (2013.01); *G03G 21/0094* (2013.01); *C10M 2207/1203* (2013.01); *C10N 2040/14* (2013.01)

(58) Field of Classification Search
CPC ............ C08G 18/4854; C08G 18/6685; C08G 18/7614; C10M 105/24; C10M 2207/1203; C10N 2040/14
See application file for complete search history.

(56) References Cited

U.S. PATENT DOCUMENTS

| | | | | |
|---|---|---|---|---|
| 2010/0034560 | A1 | 2/2010 | Tanaka et al. | |
| 2010/0129126 | A1* | 5/2010 | Kosuge | G03G 21/0017 399/346 |
| 2011/0129269 | A1 | 6/2011 | Seo et al. | |
| 2011/0129270 | A1 | 6/2011 | Seo et al. | |
| 2015/0139710 | A1 | 5/2015 | Hasegawa et al. | |
| 2015/0212479 | A1 | 7/2015 | Toyama et al. | |
| 2015/0253722 | A1 | 9/2015 | Sakaguchi et al. | |
| 2015/0261171 | A1 | 9/2015 | Gondoh et al. | |
| 2016/0004206 | A1 | 1/2016 | Sakaguchi et al. | |
| 2016/0004207 | A1 | 1/2016 | Sakaguchi et al. | |
| 2016/0033925 | A1 | 2/2016 | Sakon et al. | |
| 2017/0003643 | A1 | 1/2017 | Aoyama et al. | |
| 2017/0090399 | A1* | 3/2017 | Komito | G03G 21/0094 |
| 2018/0017930 | A1 | 1/2018 | Aoyama et al. | |
| 2018/0239297 | A1 | 8/2018 | Juri et al. | |
| 2020/0301348 | A1* | 9/2020 | Nakayama | G03G 21/0017 |
| 2021/0216032 | A1 | 7/2021 | Watanabe et al. | |
| 2022/0107579 | A1 | 4/2022 | Ishizuka et al. | |
| 2022/0221817 | A1 | 7/2022 | Juri et al. | |
| 2023/0236536 | A1 | 7/2023 | Ohmori et al. | |
| 2024/0053700 | A1 | 2/2024 | Ohmori et al. | |
| 2024/0152085 | A1 | 5/2024 | Juri et al. | |
| 2024/0255889 | A1 | 8/2024 | Ohmori et al. | |
| 2024/0255890 | A1 | 8/2024 | Goto et al. | |

FOREIGN PATENT DOCUMENTS

| | | | |
|---|---|---|---|
| JP | 2010-039304 | A | 2/2010 |
| JP | 2011-138106 | A | 7/2011 |
| JP | 2011-138109 | A | 7/2011 |
| JP | 2012-058539 | A | 3/2012 |
| JP | 2022-158245 | A | 10/2022 |
| WO | 2022/209425 | A1 | 10/2022 |
| WO | 2025/022219 | A1 | 1/2025 |

OTHER PUBLICATIONS

U.S. Appl. No. 18/665,918, filed May 16, 2024.
Extended European Search Report issued Nov. 5, 2025 in European Patent Application No. 25182528.7, 10 pages.

* cited by examiner

PROTECTIVE LAYER FORMING DEVICE AND IMAGE FORMING APPARATUS

CROSS-REFERENCE TO RELATED APPLICATION

This patent application is based on and claims priority pursuant to 35 U.S.C. § 119(a) to Japanese Patent Application No. 2024-095858, filed on Jun. 13, 2024, in the Japan Patent Office, the entire disclosure of which is hereby incorporated by reference herein.

BACKGROUND

Technical Field

The present disclosure relates to a protective layer forming device and an image forming apparatus incorporating the protective layer forming device.

Related Art

In electrophotography, an electrostatic latent image is formed on an image bearer, and a developing device develops the electrostatic latent image with charged toner to form a visible image. The visible image is transferred onto a recording medium.

After the visible image has been transferred from the image bearer onto the recording medium (this process may be referred to as "transfer process" below), some toner particles may remain on the image bearer without being transferred. When a new electrostatic latent image is formed on the image bearer with such residual toner particles remaining on the image bearer, the image bearer is prevented from being uniformly charged. To countermeasure the above disadvantage, residual toner particles are removed from the image bearer in a process called cleaning process after the transfer process, and the image bearer is charged. In addition, applying an image bearer protective agent which contains fatty acid metal salt and inorganic lubricant (e.g., boron nitride) to the surface of the image bearer has been proposed to prevent toner particles from remaining on the image bearer after the transfer process.

SUMMARY

The present disclosure described herein provides a protective layer forming device including lubricant and a lubricant application blade. The lubricant includes fatty acid metal salt. The lubricant application blade includes a contact portion contacting a surface of an image bearer. The contact portion includes polyurethane elastomer that includes a reaction product of polytetramethylene ether glycol, aromatic isocyanate, and amine. The contact portion has a Martens hardness of 5.0 N/mm$^2$ or more and 30.0 N/mm$^2$ or less. The lubricant applied to the surface of the image bearer by the lubricant application blade has a normalized ionic strength A of a metal ion amount derived from the fatty acid metal salt, satisfying a following expression (1), $$1E-4 < A < 20E-4, \quad (1)$$

where the normalized ionic strength A is measured by a time-of-flight secondary ion mass spectrometer.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
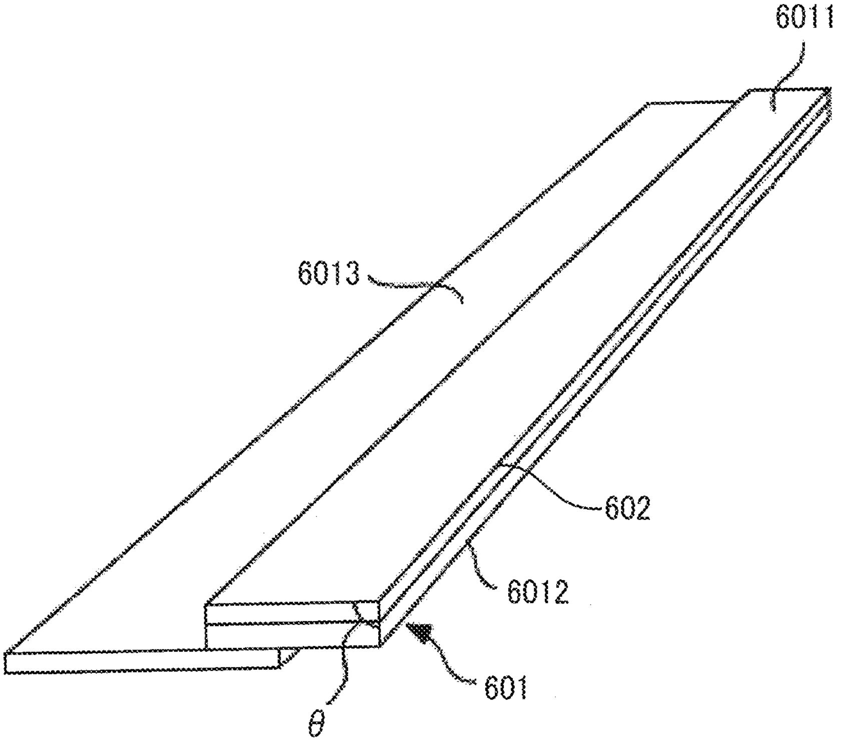
FIG. 1 is a perspective view of a lubricant application blade.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

With reference to the drawings, descriptions are given below of embodiments of the present disclosure. In the drawings illustrating the following embodiments, like reference signs are allocated to elements having the same function or shape and redundant descriptions thereof are omitted below.

A lubricant application blade in a protective layer forming device according to the present disclosure includes an elastic body including a contact portion contacting a surface of an image bearer. The contact portion is made of a polyurethane elastomer containing a reaction product of polytetramethylene ether glycol, aromatic isocyanate, and amine and has a Martens hardness of 5.0 N/mm$^2$ or more and 30.0 N/mm$^2$ or less. The Martens hardness may be referred to as the HM below.

The lubricant application blade known in the art that has an obtuse blade corner angle has certainly reached a certain level in the function of preventing the contact portion from being turned up or deformed and applying the lubricant to the surface of the image bearer. However, the lubricant application blade known in the art is insufficient to achieve an increase in speed and image quality in recent image forming apparatuses.

A cleaning blade for the electrophotographic system that does not include the lubricant is made of polyurethane rubber in the related art. The cleaning blade made of polyurethane rubber increases the frictional force between the image bearer and the cleaning blade. The increased frictional force pulls the cleaning blade in the direction of movement of the image bearer and causes a problem that the contact portion of the cleaning blade (in other words, a leading edge line portion of the cleaning blade) is turned inside out. Continuing a cleaning operation while the contact portion of the cleaning blade is turned inside out causes local wear at a position several micrometers away from the contact portion of a leading end surface of the cleaning blade. If the cleaning operation is further continued in such a state, the local wear becomes large, and eventually, the contact portion is worn out and becomes missing. Missing the contact portion increases the frictional force and causes cleaning failure and, in particular, a problem that an external additive such as silica in the toner adheres to the image bearer.

The present inventors have made diligent studies to solve the above-described problems. As a result, the inventors found that setting the Martens hardness of the contact portion contacting the surface of the image bearer in the elastic body of the blade to be high, i.e., 5.0 $N/mm^2$ or more and 30.0 $N/mm^2$ or less stabilizes the behavior of the leading edge line portion of the blade and reduces the wear of the leading edge line portion caused by rubbing the blade on the image bearer. As a result, the present inventors found that the above-described lubricant application blade can prevent the occurrence of an abnormal image caused by the lubricant unevenly applied to the image bearer in a sub-scanning direction.

The following describes the features of the above-described lubricant application blade in detail with reference to the drawings.

FIG. 1 is a perspective view of the lubricant application blade. As illustrated in FIG. 1, the lubricant application blade includes a flat-plate-shaped support 6013 made of a rigid material (e.g., metal, hard plastic) and a flat-plate-shaped elastic body 601. The elastic body 601 is fixed to one end of the support 6013. The elastic body 601 may have a single-layer structure or a laminated structure. FIG. 1 illustrates the elastic body 601 having the laminated structure. The elastic body 601 includes an edge layer 6011 having the leading edge line portion and a base layer 6012. The edge layer 6011 and the base layer 6012 are typically made of urethane rubber materials having different Martens hardness values, and the base layer 6012 is made of rubber having a small environmental variation in rubber characteristics and a small permanent strain to cover the defects of the edge layer layered on the base layer.

Figure 2:
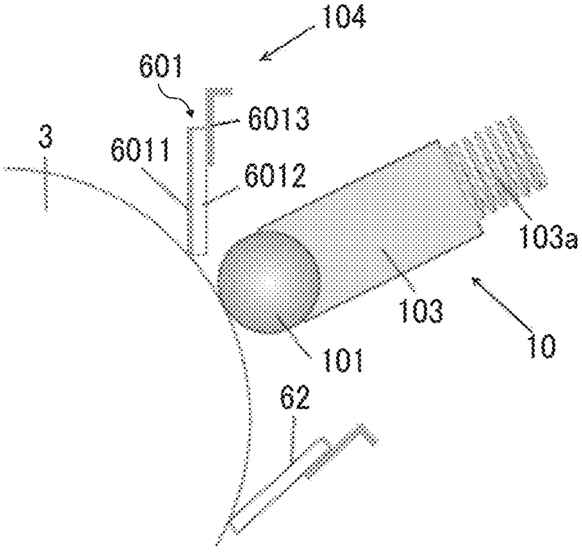
FIG. 2 is a schematic view of a lubricant application blade arranged to be in contact with an image bearer.

FIG. 2 is a schematic view of the lubricant application blade contacting the image bearer such as a photoconductor 3. As illustrated in FIG. 2, the lubricant application blade includes the elastic body 601 having a contact portion 602 that contacts the surface of the photoconductor 3 as the image bearer.

A protective layer forming device 10 includes a solid lubricant 103 and a lubricant pressing spring 103*a*. A fur brush 101 serves as an application brush that applies the solid lubricant 103 to the photoconductor 3. The solid lubricant 103 is held by a bracket 103*b* and pressed toward the fur brush 101 by the lubricant pressing spring 103*a*. As the fur brush 101 rotates so as to trail the rotation of the photoconductor 3, the solid lubricant 103 is scraped by the fur brush 101 and the scraped-off lubricant is applied to the photoconductor 3.

The elastic body is described below.

The elastic body preferably includes the edge layer and the base layer. The edge layer has the leading edge line portion contacting the image bearer. The leading edge line portion is also referred to as the contact portion. The leading edge line portion of the elastic body contacts the image bearer and is made of polyurethane elastomer, and the Martens hardness of the leading edge line portion is 5.0 $N/mm^2$ or more and 30.0 $N/mm^2$ or less.

The method for measuring the Martens hardness is not limited and may be appropriately selected to suit a particular application. For example, the Martens hardness may be measured using a microhardness measurement instrument (FISCHERSCOPE HM2000 available from Fischer Instruments K.K.), under conditions where a Vickers indenter is pressed into the surface of a sample with a force of 9.8 mN for 30 seconds, kept for 5 seconds, and drawn up with a force of 9.8 mN for 30 seconds.

The shape, size, and structure of the elastic body are not limited and can be suitably selected to suit a particular application. The shape of the elastic body may be, for example, a flat plate shape, a strip shape, or a sheet shape. The size of the elastic body is not limited and may be appropriately selected depending on the size of the image bearer.

The polyurethane elastomer of the elastic body preferably contains the reaction product of polytetramethylene ether glycol, aromatic isocyanate, and amine. The polytetramethylene ether glycol, the aromatic isocyanate, and the amine react with each other, and the molecules are bonded to each other by a urethane bond, which gives a cured reaction product. The cured reaction product may be referred to as a "cured product" below.

As a result of the diligent studies, the present inventors found that polytetramethylene ether glycol (PTMG) can be preferably used as the polyol component of the polyurethane elastomer.

The number average molecular weight of the polytetramethylene ether glycol is not limited and may be appropriately selected to suit a particular application but is preferably from 850 to 2000. The number-average molecular weight of 850 or more and 2000 or less enables the polyurethane elastomer to have a relatively high Martens hardness of 5.0 $N/mm^2$ or more and 30.0 $N/mm^2$ or less to exhibit an elastic function.

The method for measuring the number average molecular weight is not limited and may be appropriately selected to suit a particular application. For example, the number average molecular weight may be measured by measuring components soluble in tetrahydrofuran (THF) by Gel Permeation Chromatography (GPC) under the following conditions.

GPC instrument: HLC 8120GPC manufactured by Tosoh Corporation
Columns: TSK GEL manufactured by Tosoh Corporation
Solvent: Tetrahydrofuran (THF)
Solvent concentration: 0.5% by mass
Flow rate: 1.0 ml/min The urethane prepolymer of the elastic body is not limited and may be appropriately selected. However, as a result of intensive studies, the present inventors found that a polyurethane elastomer containing a urea bond formed by a reaction between a prepolymer in which a hydroxy group of a polyol is substituted with a bifunctional isocyanate and an aromatic diamine is preferable.

The bifunctional isocyanate is not limited and may be appropriately selected to suit to a particular application. Examples thereof include, but are not limited to, dicyclohexylmethane 4,4'-diisocyanate (hydrogenated methylene diphenyl diisocyanate (MDI)), methylene diphenyl diisocyanate (MDI), tolylene diisocyanate (TDI), xylylene diisocyanate (XDI), naphthylene 1,5-diisocyanate (NDI), tetramethylxylene diisocyanate (TMXDI), isophorone diisocyanate (IPDI), hydrogenated xylylene diisocyanate (H6XDI), dicyclohexylmethane diisocyanate (H12MDI), hexamethylene diisocyanate (HDI), dimer acid diisocyanate (DDI), norbornene diisocyanate (NBDI), and trimethylhexamethylene diisocyanate (TMDI). Each of these can be used alone or in combination. Among these, tolylene diisocyanate (TDI) is preferable.

The aromatic diamine is not limited and may be appropriately selected to suit to a particular application. Examples thereof include diethylmethylbenzenediamine, dimethylthiotoluenediamine, 4,4'-diaminodiphenyl ether, 2,2'-bis [4-(4-aminophenoxy)phenyl]propane, bis [4-(4-aminophenoxy) phenyl] sulfone, 1,3-bis (4-aminophenoxy) benzene, 4,4'-diaminodiphenyl sulfone, 4,4'-methylene-bis (2-chloroaniline), and trimethylene-bis (4-aminobenzoate). Each of these can be used alone or in combination. Among these, dimethylthiotoluenediamine is preferable.

A method for preparing the polyurethane elastomer is not limited and may be appropriately selected to suit to a particular application. For example, the polyurethane elastomer can be prepared by substituting a hydroxy group of a polyether polyol with a bifunctional isocyanate to prepare a polyurethane prepolymer, adding an aromatic diamine to the polyurethane prepolymer, and reacting an NCO group of the prepolymer with an amino group of the aromatic diamine as a curing agent to form a urea bond.

The material of the base layer of the elastic body is not limited and can be suitably selected to suit to a particular application. Preferred examples thereof include polyurethane elastomer that can easily achieve high elasticity.

The polyurethane elastomer of the base layer can be manufactured as follows. First, a polyurethane prepolymer is prepared from a polyol compound and a polyisocyanate compound, then a curing agent is added thereto, optionally along with a curing catalyst, to cause a cross-linking reaction in a predetermined mold. Next, the product is post-cross-linked in a furnace, formed into a sheet by centrifugal molding, left at room temperature for aging, and cut into a flat plate having a predetermined size.

The polyol compound is not limited and may be suitably selected to suit a particular application. Examples thereof include, but are not limited to, high-molecular-weight polyols and low-molecular-weight polyols.

The high-molecular-weight polyol has a molecular weight of 500 or more, and Specific examples of the high-molecular-weight polyols include, but are not limited to, a polyester polyol which is a condensate of an alkylene glycol and an aliphatic diprotic acid; polyester-based polyols, such as polyester polyols of alkylene glycols with adipic acid, such as ethylene adipate ester polyol, butylene adipate ester polyol, hexylene adipate ester polyol, ethylene propylene adipate ester polyol, ethylene butylene adipate ester polyol, and ethylene neopentylene adipate ester polyol; polycaprolactone-based polyols such as polycaprolactone ester polyols obtained by ring-opening polymerization of caprolactone; and polyether-based polyols such as poly (oxytetramethylene) glycol and poly(oxypropylene) glycol. Each of these can be used alone or in combination.

The low-molecular-weight polyol has a molecular weight of less than 500. Specific examples of the low-molecular-weight polyols include, but are not limited to, trivalent or more polyhydric alcohols such as 1,4-butanediol, ethylene glycol, neopentyl glycol, hydroquinone-bis(2-hydroxyethyl) ether, 3,3'-dichloro-4,4'-diaminodiphenylmethane, and 4,4'-diaminodiphenylmethane; and trivalent or higher polyols such as 1,1,1-trimethylolpropane, glycerin, 1,2,6-hexanetriol, 1,2,4-butanetriol, trimethylolethane, 1,1,1-tris(hydroxyethoxymethyl)propane, diglycerin, and pentaerythritol. Each of these can be used alone or in combination.

The polyisocyanate compound is not limited and can be suitably selected to suit to a particular application. Specific examples thereof include, but are not limited to, methylene diphenyl diisocyanate (MDI), tolylene diisocyanate (TDI), xylylene diisocyanate (XDI), naphthylene 1,5-diisocyanate (NDI), tetramethylxylene diisocyanate (TMXDI), isophorone diisocyanate (IPDI), hydrogenated xylylene diisocyanate (H6XDI), dicyclohexylmethane diisocyanate (H12MDI), hexamethylene diisocyanate (HDI), dimer acid diisocyanate (DDI), norbornene diisocyanate (NBDI), and trimethylhexamethylene diisocyanate (TMDI). Each of these can be used alone or in combination.

The curing catalyst is not limited and may be suitably selected to suit a particular application. Specific examples thereof include, but are not limited to, 2-methylimidazole and 1,2-dimethylimidazole. The proportion of the curing catalyst to the polyurethane prepolymer is not limited and may be suitably selected to suit a particular application, but is preferably from 0.01% to 0.5% by mass, more preferably from 0.05% to 0.3% by mass.

The Martens hardness of the base layer is not limited and may be suitably selected to suit a particular application but is preferably from 0.5 N/mm$^2$ to 2.0 N/mm$^2$. When the Martens hardness of the base layer is 0.5 N/mm$^2$ or more, the hardness of the base layer is appropriate, and the base layer is easily cut after centrifugal molding. The base layer having the Martens hardness of 2.0 N/mm$^2$ or less has a small environmental change and a small permanent set.

The method for measuring the Martens hardness is not limited and may be appropriately selected to suit a particular application. For example, the Martens hardness may be measured by using a microhardness measurement instrument HM2000 available from Fischer Instruments K.K.

The base layer is not limited and may be suitably selected to suit a particular application, but a laminate of two or more types of rubbers having different Martens hardness values, integrated by molding, is preferred for achieving both wear resistance and conformability.

The average thickness of the lubricant application blade is not limited and may be appropriately selected depending on the intended purpose, but is preferably from 1.0 mm to 2.5 mm.

Preferably, the leading edge line portion of the lubricant application blade has an edge angle θ of from 90° to 140°.

The support is described below.

The shape, size, and material of the support are not limited and may be suitably selected to suit a particular application. The shape of the support is not limited and may be suitably selected to suit a particular application. Examples of the shape of the support include, but are not limited to, a flat plate shape, a strip shape, or a sheet shape. The size of the support is not limited and may be suitably selected according to the size of the image bearer. The material of the support is not limited and may be suitably selected to suit to a particular application. Examples of the material include, but are not limited to, metals, plastics, and ceramics. Among these, metal plates such as steel plates (e.g., stainless steel plates), aluminum plates, and phosphor bronze plates are preferred for their strength.

The lubricant as an image bearer protective agent is described below.

As the lubricant, in addition to the fatty acid metal salt, another lubricant may be suitably selected and used to suit a particular application. Examples of the lubricant include waxes and silicone oils.

As the fatty acid metal salt, lamellar crystal powder is preferably used. The lamellar crystal powder has a layered structure in which amphiphilic molecules are self-organized. When a shear force is applied thereto, it is likely that crystals are broken and separated along the layers. This feature is considered to be effective in reducing the friction coefficient. The lamellar crystal powder is not limited and may be suitably selected to suit a particular application. Examples of the lamellar crystal powder include, but are not limited to, zinc stearate.

The fatty acid is not limited and may be suitably selected to suit a particular application. Examples of the fatty acid include, but are not limited to, undecylic acid, lauric acid, tridecylic acid, myristic acid, palmitic acid, pentadecyl acid, stearic acid, heptadeccylic acid, arachic acid, montanic acid, oleic acid, arachidonic acid, caprylic acid, capric acid, or caproic acid. The metal of the fatty acid metal salt is not limited and may be appropriately selected to suit a particular application. Examples of the metal include, but are not limited to, zinc, iron, copper, magnesium, aluminum, and calcium.

The fatty acid metal salt is applied to the surface of the image bearer so that a normalized ionic strength A of a metal ion amount derived from the fatty acid metal salt measured by a time-of-flight secondary ion mass spectrometer satisfies the following expression (1).

$$1E\text{-}4 < A < 20E\text{-}4 \qquad (1)$$

The above "1E-4<A<20E-4" means "$1\times10^{-4}<A<20\times10^{-4}$."

The ionic strength A is preferably in the range of 1E-4 to 20E-4, more preferably in the range of 1E-4 to 10E-4. Too small ionic strength does not give sufficient image bearer protective performance and causes the wear of the image bearer and the scratches on the image bearer at an initial stage. In contrast, too large ionic strength is likely to cause a white streak image called "image blurring" in a so-called high temperature and high humidity (HH) environment such as a temperature of 28 °C or more and a humidity of 85% or more. It is said that the image blurring occurs as follows. A charger such as a charging roller or a scorotron charger to charge the image bearer generates nitrogen oxide (NOX). The protective layer absorbs the NOX. The NOX in the protective layer hinders the image bearer from being charged normally. As a result the image blurring occurs. The thicker the protective layer is, the higher the risk of occurrence of the image blurring is. The difference in the thickness of the protective layer larger than 50% in the longitudinal direction similarly causes the white streaks due to the protective layer.

An image forming apparatus and an image forming method are described below.

The image forming apparatus in the present disclosure includes at least the image bearer, the charger, an irradiator, a developing device, a transferor, a fixing device, a remover, and optionally includes another device suitably selected as necessary, such as the protective layer forming device. The charger and the irradiator may be collectively referred to as an electrostatic latent image forming device.

The image forming method used in the present disclosure includes at least a charging process, an exposure process, a developing process, a transfer process, a fixing process, and a removing process and optionally includes another process suitably selected as necessary, such as a protective layer forming process. The charging process and the exposure process may be collectively referred to as an electrostatic latent image forming process.

The image forming apparatus according to the present disclosure can suitably perform the image forming method according to the present disclosure. The charger can perform the charging process. The irradiator can perform the exposure process. The developing device can perform the developing process. The transferor can perform the transfer process. The fixing device can perform the fixing process. The remover can perform the removing process. The other processes can be performed by the other corresponding devices.

The image bearer is described below.

The image bearer, which is also referred to as an electrophotographic photoconductor or a photoconductor in the following description, is not limited in material, shape, structure, and size, and can be appropriately selected from known materials. As the shape, drum-like shape is preferred. Specific examples of the materials include, but are not limited to, inorganic photoconductors such as amorphous silicon and selenium, and organic photoconductors such as polysilane and phthalopolymethine.

As the organic photoconductor, there are a laminated type photoconductor and a single-layer type photoconductor. The laminated type photoconductor has a laminated structure containing a layer (a charge generation layer) in which charge-generating materials such as non-metallic phthalocyanine or titanyl phthalocyanine are dispersed in a binder resin and a layer (a charge transport layer) in which charge transport materials are dispersed in a binder resin. These layers are stacked on a support such as an aluminum drum. The single-layer type photoconductor has a single-layer structure with a photosensitive layer containing both charge-generating materials and charge transport materials dispersed in a binder resin on a support.

In the single-layer type photoconductor, hole transport agents and electron transport agents as charge transport materials are added to the photosensitive layer.

Additionally, the option exists to include an undercoat layer between the support and either the charge-generation layer in the laminated type photoconductor or the photosensitive layer in the single-layer type photoconductor.

The charger and the charging process are described below.

In the charging process, the charger charges the surface of the image bearer.

A voltage is applied to the charger, and the charger charges the surface of the image bearer in the charging process. The charger is not limited and may be suitably selected to suit a particular application. Examples of the charger include, but are not limited to, contact chargers equipped with a conductive or semiconductive roller, brush, film, or rubber blade, and non-contact chargers employing corona discharge such as a corotron and the scorotron.

The shape of the charger is determined in accordance with the specification or configuration of the electrophotographic image forming apparatus, and may be in the form of a roller, a magnetic brush, or a fur brush. The magnetic brush may include various ferrite particles (e.g., Zn—Cu ferrite) serving as the charger, a non-magnetic conductive sleeve for supporting the ferrite particles, and a magnet roll contained inside the conductive sleeve. The fur brush may be made of fur having been subjected to a conductive treatment with carbon, copper sulfide, a metal, or a metal oxide. Such fur is wound around or attached to a metal cored bar or a cored bar having been subjected to a conductive treatment to be formed into the charger.

The charger is not limited to the contact charger. However, the contact charger is preferred because the amount of ozone generated by the contact charger is small.

Preferably, the charger is disposed to be in or out of contact with the image bearer and charge the surface of the image bearer by applying a direct-current voltage and an alternating-current voltage superimposed on one another.

A charging roller disposed close to but out of contact with the image bearer via a gap tape is also preferable as the charger, and applying a direct-current voltage and an alternating-current voltage superimposed on one another to the charging roller charges the surface of the image bearer.

The irradiator and the exposure process are described below.

In the exposure process, the irradiator exposes the charged surface of the image bearer. The irradiator irradiates the surface of the image bearer with light to form an electrostatic latent image. An optical system in the irradiator is roughly divided into an analog optical system and a digital optical system. The analog optical system directly projects an original document onto the surface of the image bearer. The digital optical system receives image data as electrical signals, converts the electrical signals into optical signals, and irradiates the electrophotographic photoconductor as the image bearer with the optical signals to form the image.

As for the irradiator, as long as the surface of the image bearer that is charged by the charger is exposed to form a latent electrostatic image, there is no particular limitation, and various irradiators such as a copying optical system, a rod lens array system, a laser optical system, a liquid crystal shutter optical system, and an LED optical system can be selected to suit a particular application. The exposure process can also be conducted by irradiating the back surface of the image bearer with light to form the image.

The developing process and the developing device are described below.

In the developing process, the developing device develops the electrostatic latent image with the toner to form a visible image. The visible image can be formed by developing the electrostatic latent image with the toner by the developing device. The developing device is not limited in configuration so long as the developing device can develop the electrostatic latent image with the toner. The developing device may be selected from known developing devices that store the toner and develop the electrostatic latent image by a contact developing method or a non-contact developing method.

The developing device may employ either a dry developing method or a wet developing method. The developing device may be either a monochrome developing device or a multicolor developing device. Preferably, the developing device includes a stirrer that stirs developer to triboelectrically charge the toner and a rotatable magnet roller.

In the developing device, toner particles and carrier particles are mixed and stirred. The toner particles are charged by friction and retained on the surface of the rotating magnet roller, thus forming a magnetic brush. The magnet roller is disposed proximity to the electrostatic latent image bearer, so that a part of the toner particles composing the magnetic brush formed on the surface of the magnet roller are moved to the surface of the electrostatic latent image bearer by electric attractive force. As a result, the electrostatic latent image is developed with the toner particles, and the visible image is formed with the toner particles on the surface of the image bearer.

The toner contained in the developing device may be a developer containing the toner, and the developer may be either a one-component developer or a two-component developer.

A premix developer system may be adopted as the developing system. In the premix developer system, a premix developer in which the toner and the carrier are mixed in advance is supplied to the developing device. The amount of carrier in the developing device increases, but the increased amount of the carrier is discharged as an excess developer in the premix developer system. As a result, the developer in the developing device is gradually refreshed. The premix developer system can extend the replacement cycle due to the deterioration of the developer and save the work of replacing the developer.

The transfer Process and the transferor are described below.

The transfer process is a process in which the visible image is transferred onto a recording medium. It is preferable that the visible image is primarily transferred onto an intermediate transferor and then secondarily transferred onto the recording medium. Specifically, the transfer process includes a primary transfer process in which the visible image formed with two or more toners with different colors, preferably in full colors, is transferred onto the intermediate transferor to form a composite transferred image, and a secondary transfer process in which the composite transferred image is transferred onto the recording medium.

The transferor performs the transfer process. Preferably, the transferor includes a primary transfer device to transfer the visible image onto an intermediate transferor to form a composite transfer image, and a secondary transfer device to transfer the composite transfer image onto a recording medium. The intermediate transferor is not limited and can be suitably selected from among known transferors to suit to a particular application. Preferred examples of the intermediate transferor include, but are not limited to, a transfer belt.

The primary transfer device forms a primary transfer electric field moving the toner from the image bearer to the intermediate transferor, and the secondary transfer device forms a secondary transfer electric field moving the toner from the intermediate transferor to the recording medium. The number of the transfer devices is at least one and may be two or more. Specific examples of the transferor include, but are not limited to, a corona transferor utilizing corona discharge, a transfer belt, a transfer roller, a pressure transfer roller, and an adhesive transferor.

Although the recording medium is typically plain paper, the recording medium is not limited to a particular medium and can be suitably selected to suit to a particular application as long as an unfixed developed image can be transferred. For example, a polyethylene terephthalate (PET) base for use in overhead projector (OHP) can be used as the recording medium.

The fixing process and the fixing device are described below.

In the fixing process, the fixing device fixes the toner transferred to the recording medium onto the recording medium. For example, the fixing device includes a heater, a fixing belt, and a pressure roller. The heater heats the fixing belt to a fixing target temperature in a range from 80 °C to 200 °C. The pressure roller is pressed against the fixing belt to form a fixing nip. The recording medium passes through the fixing nip, and heat and pressure are applied to the toner on the recording medium to fix the toner onto the recording medium. Various types of fixing devices exist and are used.

The removing process and the remover are described below.

In the removing process, the remover suitably removes the toner remaining on the image bearer. As the remover, the cleaning blade may be used.

In the protective layer forming process, the protective layer forming device applies lubricant to the surface of the image bearer and levels the lubricant.

The protective layer is formed by pressing solid lubricant 103 against the fur brush 101 using a lubricant pressing spring 103*a* in the protective layer forming device 10, rotating the fur brush 101 to apply the lubricant to the surface of the photoconductor 3 as the image bearer, and then uniformly applying the lubricant using a lubricant application blade 104.

The lubricant application blade is preferably pressed against the image bearer at a contact linear pressure of 0.5 N/m or more and 10.0 N/m or less.

The other Processes and the other devices are described below.

The other devices may include, for example, a neutralizer, a recycler, and a controller. The other processes may include, for example, a neutralization process, a recycling process, and a control process.

The neutralization process and the neutralizer are described below.

In the neutralization process, the neutralizer such as a neutralization lamp uniformly reduces the electric potential of the image bearer. The neutralizer is not limited to the neutralization lamp and may be a corona discharger.

The recycling process and the recycler are described below.

In the recycling process, the recycler recycles the toner removed in the removing process to the developing device. The recycler is not limited and may be a conveyor.

The control process and the controller are described below.

In the control process, the controller controls the above-described processes.

The controller is not limited to a certain device and can be suitably selected to suit a particular application as long as the controller can control the above-described processes. Specific examples of the controller include, but are not limited to, a sequencer and a computer.

An image forming apparatus 500 is described below with reference to FIGS. 3 and 4.

Figure 3:
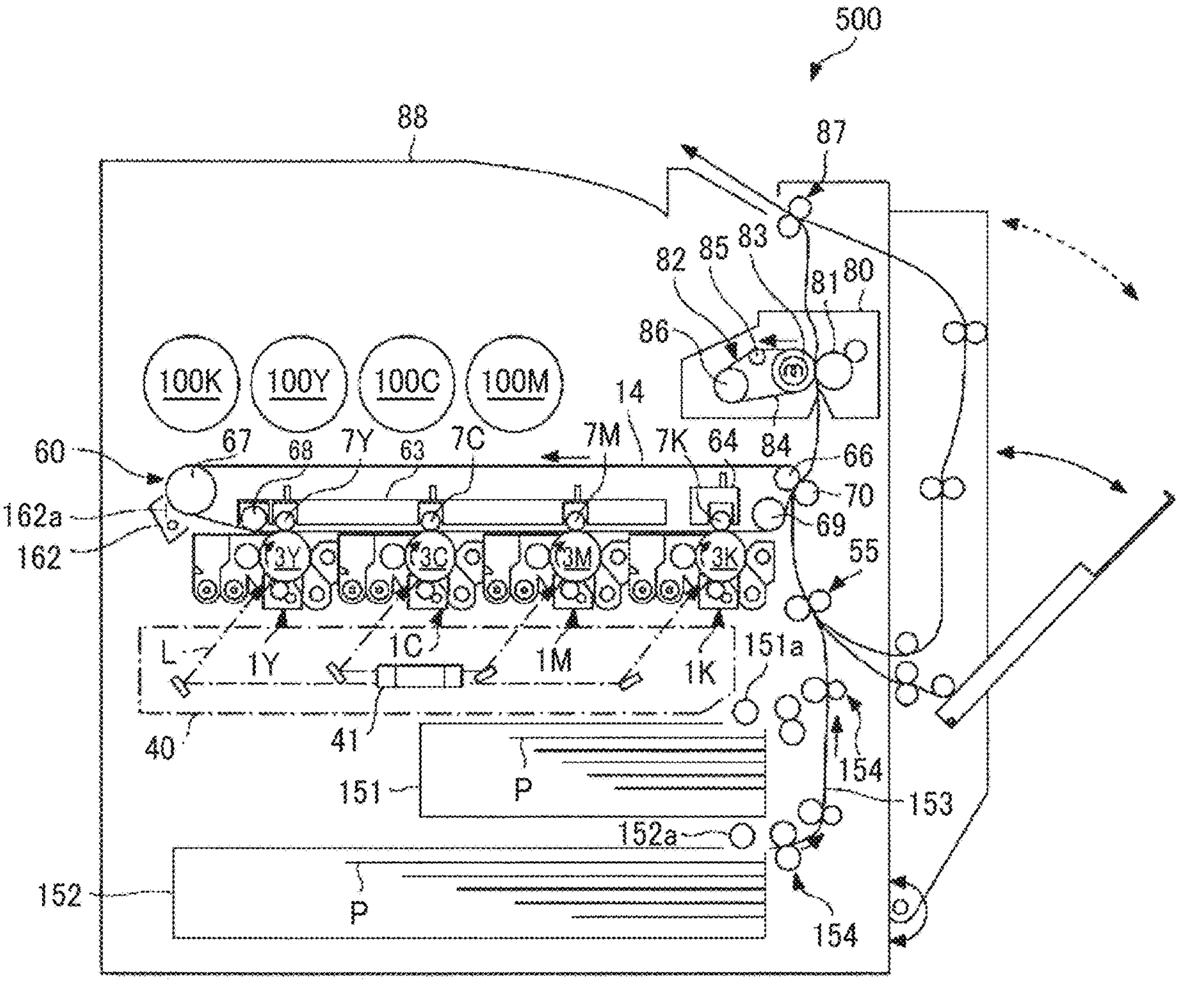
FIG. 3 is a schematic diagram illustrating a configuration of an image forming apparatus.

FIG. 3 is a schematic diagram illustrating a configuration of the image forming apparatus 500. The image forming apparatus 500 includes four image forming units 1Y, 1C, 1M, and 1K for forming yellow, cyan, magenta, and black images, respectively. The image forming units 1Y, 1C, 1M, and 1K have the same configuration except for storing different color toners, i.e., yellow, cyan, magenta, and black toners, respectively, as image forming materials.

Above the four image forming units 1Y, 1C, 1M, and 1K, which are collectively described as image forming units 1 below, a transfer unit 60 is disposed. The transfer unit 60 includes an intermediate transfer belt 14 as the intermediate transferor. The image forming units 1Y, 1C, 1M, and 1K include photoconductors 3Y, 3C, 3M, and 3K, respectively, on which toner images with colors are to be formed. The toner images are superimposed on top of one another on a surface of the intermediate transfer belt 14.

An elastic intermediate transfer belt may be used as the intermediate transfer belt 14. The elastic intermediate transfer belt may include, for example, a rigid base layer having relatively flexibility and a flexible elastic layer layered on the base layer.

In addition, the intermediate transfer belt 14 may include a guide on the inner circumferential surface of the intermediate transfer belt 14 to prevent the intermediate transfer belt 14 from meandering. Below the four image forming units 1, an optical writing unit 40 is disposed. The optical writing unit 40, serving as a latent image forming device, emits laser light L based on image data to the photoconductors 3Y, 3C, 3M, and 3K in the image forming units 1Y, 1C, 1M, and 1K. Thus, electrostatic latent images for yellow, cyan, magenta, and black images are formed on the photoconductors 3Y, 3C, 3M, and 3K, respectively. In the optical writing unit 40, the laser light L is emitted from a light source, deflected by a polygon mirror 41 that is driven and rotated by a motor, and directed to the photoconductors 3Y, 3M, 3C, and 3K through multiple optical lenses and mirrors. Alternatively, the optical writing unit 40 may be replaced with another unit in which a light-emitting diode (LED) array performs optical scanning.

Below the optical writing unit 40, a first sheet feeding tray 151 and a second sheet feeding tray 152 are disposed so as to overlap in the vertical direction. In each sheet feeding tray, multiple recording media P are stacked on top of one another. The top one of the recording media P in each sheet feeding tray is in contact with a first sheet feeding roller 151*a* or a second sheet feeding roller 152*a*. As the first sheet feeding roller 151*a* is rotated counterclockwise in FIG. 3 by a driver, the top one of the recording media P in the first sheet feeding tray 151 is fed to a sheet feeding path 153 that is vertically extended on the right side of the sheet feeding trays in FIG. 3. As the second sheet feeding roller 152*a* is rotated counterclockwise in FIG. 3 by a driver, the top one of the recording media P in the second sheet feeding tray 152 is fed to the sheet feeding path 153.

On the sheet feeding path 153, multiple conveyance roller pairs 154 are disposed. The recording medium P fed to the sheet feeding path 153 is conveyed upward in FIG. 3 inside the sheet feeding path 153 while being nipped by the rollers of the conveyance roller pairs 154.

On a downstream end of the sheet feeding path 153 relative to the direction of conveyance of the recording medium P, a registration roller pair 55 is disposed. Immediately after the rollers of the registration roller pair 55 nip the recording medium P fed by the conveyance roller pairs 154, the registration roller pair 55 stops rotating. The registration roller pair 55 then timely feeds the recording medium P to a secondary transfer nip, which is described below.

Figure 4:
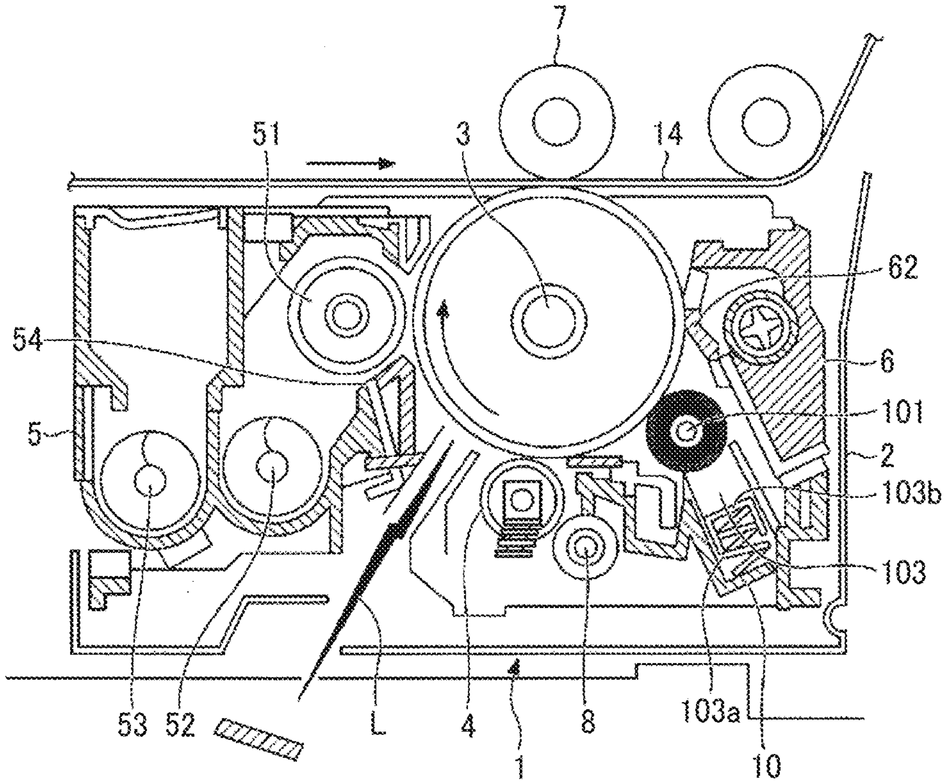
FIG. 4 is a schematic diagram illustrating a configuration of one of image forming units in the image forming apparatus of FIG. 3.

FIG. 4 is a schematic diagram illustrating a configuration of one of image forming units in the image forming apparatus of FIG. 3. As illustrated in FIG. 4, each of the image forming units 1 includes the drum-shaped photoconductor 3 serving as the image bearer. The photoconductor 3 has a drum shape but may have a sheet shape or an endless belt shape.

Around the photoconductor 3, a charging roller 4, a developing device 5, a primary transfer roller 7, a cleaner 6, a protective layer forming device 10, and a neutralization lamp are disposed. The charging roller 4 is a charging member of the charger. The developing device 5 develops an electrostatic latent image formed on a surface of the photoconductor 3 into a toner image. The primary transfer roller 7 is a primary transferor of the primary transfer device that transfers the toner image from the surface of the photoconductor 3 onto the intermediate transfer belt 14.

The cleaner 6 is the remover that removes residual toner particles remaining on the photoconductor 3 after the toner image has been transferred from the photoconductor 3 onto the intermediate transfer belt 14. The protective layer forming device 10 applies the lubricant to the surface of the photoconductor 3 having been cleaned by the cleaner 6 and levels the lubricant on the surface of the photoconductor 3. The neutralization lamp is the neutralizer that neutralizes the surface potential of the photoconductor 3 having been cleaned.

The charging roller 4 is disposed at a predetermined distance from the photoconductor 3 without contacting the photoconductor 3. The charging roller 4 charges the photoconductor 3 to a predetermined potential with a predetermined polarity. After the charging roller 4 has uniformly charged the surface of the photoconductor 3, the optical writing unit 40 emits the laser light L to the charged surface of the photoconductor 3 based on image data to form the electrostatic latent image.

The developing device 5 includes a developing roller 51 serving as a developer bearer. A power supply applies a developing bias to the developing roller 51. In the casing of the developing device 5, a supply screw 52 and a stirring screw 53 are provided for stirring the developer contained in the casing while conveying the developer in opposite directions. Also, a doctor 54 for restricting the developer carried on the developing roller 51 is disposed in the casing. As the developer is stirred and conveyed by the supply screw 52 and the stirring screw 53, toner particles in the developer are charged to have a predetermined polarity. The developer is then carried on the surface of the developing roller 51 and restricted by the doctor 54. Toner particles in the developer adhere to a latent image formed on the photoconductor 3 at a developing region where the developing roller 51 faces the photoconductor 3.

The cleaner 6 includes the fur brush 101 and a cleaning blade 62. The cleaning blade 62 is in contact with the photoconductor 3 so as to face in the direction of movement of the surface of the photoconductor 3.

The charger employs a non-contact proximity arrangement system in which the charging roller 4 is disposed in proximity to the photoconductor 3 without contacting the photoconductor 3. Alternatively, any known charger such as the corotron, the scorotron, and a solid-state charger can also be used as the charger. Among these charging systems, contact charging systems and non-contact proximity arrangement systems are preferred because they have advantages in terms of high charging efficiency, less generation of ozone, and compact size.

Examples of the light source of the optical writing unit 40 that emits the laser light L and the light source of the neutralization lamp include all luminous matters such as fluorescent lamp, tungsten lamp, halogen lamp, mercury lamp, sodium-vapor lamp, light-emitting diode (LED), laser diode (LD), and electroluminescence (EL).

For the purpose of emitting only light having a desired wavelength, any type of filter can be used, such as a sharp cut filter, band pass filter, near-infrared cut filter, dichroic filter, interference filter, and color-temperature conversion filter.

Among these light sources, light-emitting diode and semiconductor laser are preferred since they can emit long-wavelength light (600 to 800 nm) with high energy.

As illustrated in FIG. 3, the transfer unit 60 serving as the transferor further includes a belt cleaning unit 162, a first bracket 63, and a second bracket 64 in addition to the intermediate transfer belt 14. The transfer unit 60 further includes four primary transfer rollers 7Y, 7M, 7C, and 7K, a secondary transfer backup roller 66, a driving roller 67, an auxiliary roller 68, and a tension roller 69. The intermediate transfer belt 14 is stretched taut with these eight rollers, and the driving roller 67 rotates the intermediate transfer belt 14 counterclockwise in FIG. 3. The four primary transfer rollers 7Y, 7M, 7C, and 7K nip the intermediate transfer belt 14 together with the four photoconductors 3Y, 3M, 3C, and 3K to form the four primary transfer nips between the intermediate transfer belt 14 and the photoconductors 3Y, 3M, 3C, and 3K, respectively. The back surface (i.e., an inner circumferential surface of the loop) of the intermediate transfer belt 14 is then applied with a transfer bias having the opposite polarity to the toner (e.g., positive polarity). As the intermediate transfer belt 14 rotates while sequentially passing the primary transfer nips for yellow, cyan, magenta, and black, the toner images of yellow, cyan, magenta, and black formed on the photoconductors 3Y, 3C, 3M, and 3K are superimposed on one another on the outer circumferential surface of the intermediate transfer belt 14. Thus, a composite toner image in which four color toner images are superimposed on one another is formed on the intermediate transfer belt 14.

The intermediate transfer belt 14 is interposed between a secondary transfer roller 70 disposed outside the loop of the intermediate transfer belt 14 and the secondary transfer backup roller 66 to form a secondary transfer nip. The above-described registration roller pair 55 feeds the recording medium P to the secondary transfer nip in synchronization with an entry of the composite toner image on the intermediate transfer belt 14 into the secondary transfer nip. The composite toner image on the intermediate transfer belt 14 is secondarily transferred onto the recording medium P in the secondary transfer nip by the actions of a secondary transfer electric field and the nip pressure. The secondary transfer electric field is formed between the secondary transfer roller 70 to which a secondary transfer bias is applied and the secondary transfer backup roller 66. The composite toner image is combined with the white color of the recording medium P to generate a full-color image.

On the intermediate transfer belt 14 having passed through the secondary transfer nip, residual toner particles that have not been transferred onto the recording medium P remain. These residual toner particles are removed by the belt cleaning unit 162. The belt cleaning unit 162 includes a belt cleaning blade 162*a* in contact with the outer circumferential surface of the intermediate transfer belt 14. The belt cleaning blade 162*a* scrapes off the residual toner particles from the intermediate transfer belt 14.

The image forming apparatus 500 may include a collector to receive the toner and other substances removed by the belt cleaning unit 162. As the collector, a dish-shaped tray may be used.

The first bracket 63 of the transfer unit 60 is swingable about the rotation axis of the auxiliary roller 68 at a predetermined angle in accordance with the on/off driving operation of a solenoid. When the image forming apparatus 500 forms a black-and-white image, the solenoid is driven to slightly rotate the first bracket 63 counterclockwise in FIG. 3. This rotation of the first bracket 63 revolves the primary transfer rollers 7Y, 7C, and 7M counterclockwise in FIG. 3 about the rotation axis of the auxiliary roller 68 to bring the intermediate transfer belt 14 away from the photoconductors 3Y, 3C, and 3M. Thus, among the four image forming units 1Y, 1M, 1C, and 1K, only the image forming unit 1K for black image is brought into operation to form the black-and-white image. Since unnecessary driving of the image forming units 1Y, 1C, and 1M is avoided during the formation of the black-and-white image, undesired deterioration of compositional members of the image forming units 1Y, 1C, and 1M can be prevented.

Above the secondary transfer nip in FIG. 3, a fixing unit 80 is disposed. The fixing unit 80 includes a pressure heating roller 81 and a fixing belt unit 82. The pressure heating roller 81 contains a heat source, such as a halogen lamp, inside. The fixing belt unit 82 includes a fixing belt 84 serving as a fixing member, a heating roller 83, a tension roller 85, a driving roller 86, and a temperature sensor. The heating roller 83 contains a heat source, such as a halogen lamp, inside. The fixing belt 84 having an endless-belt form is stretched taut with the heating roller 83, the tension roller 85, and the driving roller 86 and rotates counterclockwise in FIG. 3. While the fixing belt 84 rotates, the heating roller 83 heats the inner circumferential face of the fixing belt 84. At a position where the fixing belt 84 is wound around the heating roller 83, the pressure heating roller 81 contacts the outer circumferential surface of the fixing belt 84. The pressure heating roller 81 is driven to rotate clockwise in FIG. 3. Thus, a fixing nip is formed between the pressure heating roller 81 and the fixing belt 84.

The temperature sensor is disposed outside the loop of the fixing belt 84 facing the outer circumferential surface of the fixing belt 84 forming a predetermined gap therebetween. The temperature sensor detects the surface temperature of the fixing belt 84 immediately before entering into the fixing nip. The detection result is transmitted to a fixing power supply circuit. Based on the detection result, the fixing power supply circuit controls power supplies supplying power to the heat sources contained in the heating roller 83 and the pressure heating roller 81 to turn on or off the power supplies.

The recording medium P having passed through the secondary transfer nip is then separated from the intermediate transfer belt 14 and fed to the fixing unit 80. The recording medium P is fed upward in FIG. 3 while being sandwiched by the fixing nip in the fixing unit 80. During this process, the recording medium P is heated and pressurized by the fixing belt 84, and the full-color toner image is fixed on the recording medium P.

The recording medium P having the fixed image thereon is passed through an ejection roller pair 87 and ejected outside the image forming apparatus 500. On the top surface of the housing of the image forming apparatus 500, a stack part 88 is formed. The recording media P ejected by the ejection roller pair 87 are successively stacked on the stack part 88.

Above the transfer unit 60, four toner cartridges 100Y, 100C, 100M, and 100K storing yellow toner, cyan toner, magenta toner, and black toner, respectively, are disposed. The yellow, cyan, magenta, and black toners, which are stored in the toner cartridges 100Y, 100C, 100M, and 100K, respectively, are supplied to the developing devices 5Y, 5C, 5M, and 5K in the image forming units 1Y, 1C, 1M, and 1K. The toner cartridges 100Y, 100M, 100C, and 100K are detachably mountable on the image forming apparatus main body independent from the image forming units 1Y, 1M, 1C, and 1K.

An image forming operation of the image forming apparatus 500 is described below.

In response to receipt of a print execution signal from an operation panel, the charging roller 4 and the developing roller 51 each get applied with a predetermined voltage or current at a predetermined timing. Similarly, the light sources in the optical writing unit 40 and the neutralization lamp each get applied with a predetermined voltage or current at a predetermined timing. In synchronization with the application of voltage or current, the photoconductor 3 is driven to rotate in a direction indicated by arrow in FIG. 3 by a photoconductor driving motor.

As the photoconductor 3 rotates in a direction indicated by arrow in FIG. 3, the charging roller 4 uniformly charges the surface of the photoconductor 3 to a predetermined potential. The optical writing unit 40 emits the laser light L to the charged surface of the photoconductor 3 based on image data to reduce the electric potential of a part of the surface of the photoconductor 3 irradiated with the laser light L, thereby forming an electrostatic latent image.

The surface of the photoconductor drum 3 bearing the electrostatic latent image thereon reaches a position opposite the developing device 5, and a magnetic brush formed by the developer on the developing roller 51 rubs the surface of the photoconductor 3 at the position opposite the developing device 5. As a developing bias is applied to the developing roller 51, negatively-charged toner particles on the developing roller 51 are transferred onto the electrostatic latent image, thus forming a toner image. This image forming process is performed in each of the image forming units 1Y, 1C, 1M, and 1K to form yellow, cyan, magenta, and black toner images on the photoconductors 3Y, 3C, 3M, and 3K, respectively.

Thus, in the image forming apparatus 500 employing a reversal development system, the developing device 5 develops the electrostatic latent image formed on the photoconductor 3 with negatively charged toner particles. In the present embodiment, an N/P (i.e., negative/positive) development system (in which toner particles get adhered to low-potential regions) and a non-contact charging roller are employed, but the development and charging systems are not limited thereto.

The toner images formed on the photoconductors 3Y, 3C, 3M, and 3K are primarily transferred onto the surface of the intermediate transfer belt 14 in a sequential manner so that the toner images are superimposed on top of one another on the surface of the intermediate transfer belt 14. Thus, the composite toner image is formed on the intermediate transfer belt 14.

The composite toner image ("toner image" for simplicity) formed on the intermediate transfer belt 14 is transferred onto the recording medium P which has been fed from the first sheet feeding tray 151 or the second sheet feeding tray 152, passed through the registration roller pair 55, and fed to the secondary transfer nip. The recording medium P is temporarily stopped by being sandwiched by the registration roller pair 55, and then fed to the secondary transfer nip in synchronization with the entry of the leading end of the toner image on the intermediate transfer belt 14. The recording medium P having the transferred toner image thereon is then separated from the intermediate transfer belt 14 and fed to the fixing unit 80. As the recording medium P having the transferred toner image thereon passes through the fixing unit 80, the toner image is fixed on the recording medium P by heat and pressure. The recording medium P having the fixed toner image thereon is ejected outside the image forming apparatus 500 and stacked at the stack part 88.

On the other hand, after the toner image has been transferred from the surface of the intermediate transfer belt 14 onto the recording medium P in the secondary transfer nip, the belt cleaning unit 162 removes residual toner particles remaining on the surface of the intermediate transfer belt 14.

Similarly, after the toner image has been transferred from the surface of the photoconductor 3 onto the intermediate transfer belt 14 in the primary transfer nip, the cleaner 6 removes residual toner particles remaining on the surface of the photoconductor 3. The protective layer forming device 10 then applies the lubricant to the cleaned surface, and the neutralization lamp further reduces the electric potential on the surface.

As illustrated in FIG. 4, each of the image forming units 1 of the image forming apparatus 500 has a frame body 2 accommodating the photoconductor 3 and processing devices including the charging roller 4, the developing device 5, the cleaner 6, and the protective layer forming device 10. Each of the image forming units 1 is detachably attached to the body of the image forming apparatus 500 as one unit that is a process cartridge. Thus, in the image forming apparatus 500, the photoconductor 3 and the processing devices are replaceable at the same time by replacing each of the image forming units 1 as the process cartridge. Alternatively, each of the photoconductor 3, the charging roller 4, the developing device 5, the cleaner 6, and the protective layer forming device 10 may be independently replaceable.

As the toner used in the image forming apparatus 500, polymerization toner is preferable to enhance image quality. The polymerization toner is produced by a suspension polymerization method, an emulsion polymerization method, or a dispersion polymerization method, which make it easy to make the toner highly circular and small in particle size. Among the above-described types of polymerization toner, polymerization toner having a volume average particle diameter of 5.5 μm or less is preferable from the viewpoint of forming a high-resolution image.

The lubricant application blade can be produced by production methods such as a sheet forming method or a direct forming method.

The sheet forming method includes the following procedures (1) and (2).

(1) A reaction composition liquid is cast into a sheet shape and cured by reaction to form a raw sheet, and the raw sheet is cut in a cutting process to form the blade. To form the sheet shape, a centrifugal molding method is typically used.

(2) The blade is attached to a support such as a metal plate for mounting the blade on the image forming apparatus by adhesion to form a blade unit.

The direct forming method includes the following procedures.

The support such as the metal plate for mounting the blade on the image forming apparatus is disposed in a mold having a cavity in the shape of the blade to be molded, and the reaction composition liquid is cast into the molding cavity to mold the blade and form the blade unit.

The following describes experiments performed by the present inventors and the results of the experiments. In the experiments, lubricant application blades were experimentally manufactured as some examples and comparative examples, and lubricant application performance, the cleaning performance, and various parameters were evaluated.

In the following descriptions, the numbers in parts represent mass ratios in parts, and "%" represents "% by mass," unless otherwise specified.

A first example is described below.

In the first example, a base layer 1 was manufactured as follows.

A base layer forming liquid was prepared by adding 16 parts by weight of PTG650SN manufactured by Hodogaya Chemical Co., Ltd. as a curing agent and 3 parts of trimethylolpropane manufactured by Kishida Chemical Co., Ltd. to 100 parts of TAKENATE L-2390 manufactured by Mitsui Chemicals, Inc. and stirring the mixture. Charging the base layer forming liquid to the centrifugal molding machine maintained at a temperature of 120 °C manufactured the base layer 1 made of urethane rubber A so that the film thickness and the Martens hardness measured by the following methods were the following values.

Film Thickness: 0.9 mm

Martens Hardness: 0.6 N/mm$^2$

Method for Measuring Martens Hardness

The Martens hardness was measured using a microhardness measurement instrument (FISCHERSCOPE HM2000 available from Fischer Instruments K.K.), under conditions where a Vickers indenter is pressed into the surface of sample with a force of 9.8 mN for 30 seconds, kept for 5 seconds, and drawn up with a force of 9.8 mN for 30 seconds.

Method for Measuring Film Thickness

VHX 8000 (manufactured by KEYENCE) was used to measure the film thickness of the base layer. Five points on the cross section of the base layer were measured, and the average value was calculated as the film thickness of the base layer.

In the first example, an edge layer 1 was manufactured as follows.

An edge layer forming liquid was prepared by adding 10 parts by mass of ETHACURE 300 (that is dimethylthiotoluenediamine: DMTDA) manufactured by Mitsui Fine Chemicals, Inc. as curing agent to 100 parts by mass of TAKENATE L-2360 manufactured by Mitsui Chemicals, Inc. and stirring the mixture. The edge layer has the contact portion of the blade. Accordingly, the edge layer forming liquid may be referred to as a contact portion forming liquid.

The edge layer (the contact portion) was formed by charging the edge layer (contact portion) forming liquid onto the surface of the base layer 1 in the centrifugal molding machine maintained at a temperature of 120 °C. As a result, a sheet having a thickness of 1.3 mm was prepared. The sheet had two layers made of polyurethane elastomer. A surface layer has a film thickness of 0.4 mm. After the post-curing, the sheet was processed (including cutting at an obtuse angle) to produce the lubricant application blade 1 of the first example.

The Martens hardness and the edge angle were measured by the following methods.

Method for Measuring Martens Hardness

The Martens hardness was measured using a microhardness measurement instrument (FISCHERSCOPE HM2000 available from Fischer Instruments K.K.), under conditions where a Vickers indenter is pressed into the surface of sample with a force of 9.8 mN for 30 seconds, kept for 5 seconds, and drawn up with a force of 9.8 mN for 30 seconds.

Method for Measuring Edge Angle

The edge angle means an angle θ as illustrated in FIG. 1 and was measured using VHX-8000 (manufactured by KEYENCE Corporation).

<Evaluation of Ionic Strength A of Protective Layer>

The lubricant application blade 1 of the first example that was made as described above was mounted on a process cartridge of a color multifunction peripheral (IMAGIO MP C4500 manufactured by Ricoh Co., Ltd.) so as to have a linear pressure of 0.5 N/m to 10 N/m. The process cartridge of IMAGIO MP C4500 includes a printer part that has the same configuration as the image forming unit illustrated in FIG. 4 in the image forming apparatus 500.

The protective layer forming device having the structure illustrated in FIG. 2 was used. As the fatty acid metal salt, a mixture of zinc stearate and zinc palmitate was used.

After the color multifunction peripheral continuously printed images each having an image area rate of 5% on 1,000,000 sheets (A4 size, lateral) in an ordinary temperature environment (that is 23 °C/55% RH) using evaluation toner, the total amount of the protective layer on the surface of the image bearer was evaluated as follows.

The amount of each of ions when sputtering is performed from the outermost surface of the protective layer on the image bearer to the surface of the image bearer in the depth direction was measured under the following conditions using a time-of-flight secondary ion mass spectrometer (TOF-SIMS manufactured by IONTOF). The present inventors defined a normalized ionic strength A that is obtained by dividing the total amount of metal ions derived from the fatty acid metal salt by the total amount of ions.

Ion measurement conditions
- Ion Gun: Bi3++
- Acceleration Voltage: 30 kV
- Charge Neutralization: On
- Polarity: Posi
- Raster: 300 μm Sputtering Conditions
- Ion Gun: Ar-GCIB
- Acceleration Voltage: 5 kV
- Raster: 1000 μm Times of scan: 64 times <Evaluation of Application Performance>

The lubricant application blade 1 of the first example was mounted on the process cartridge of the color multifunction peripheral (IMAGIO MP C4500 manufactured by Ricoh Co., Ltd.) so as to have a linear pressure of 0.5 N/m to 10 N/m. The process cartridge of IMAGIO MP C4500 includes the printer part that has the same configuration as the image forming unit illustrated in FIG. 4 in the image forming apparatus 500.

After the color multifunction peripheral continuously printed images each having the image area rate of 5% on 1,000,000 sheets (A4 size, lateral) in the ordinary temperature environment (that is 23 °C/55% RH) using evaluation toner, the color multifunction peripheral printed a halftone image to evaluate whether a white streak or a black streak occurred on the halftone image.

The black streak is an abnormal image that occurs when the protective layer forming function is degraded due to wear of the tip of the lubricant application blade. The white streak is an abnormal image that occurs when the lubricant application blade applies the lubricant unevenly in a longitudinal direction of the image bearer. The occurrence of the black streak or the white streak means insufficient function of the lubricant application blade.

The performance of the lubricant application blade was evaluated by ranks each defined by the following evaluation criteria.

- Rank 4: No white or black streaks are seen on the image.
- Rank 3: A white streak or a black streak is slightly observed on the image but is within an allowable range.
- Rank 2: White streaks or black streaks are slightly observed on the image, and the number of the streaks is large, but the white streaks or black streaks are within the allowable range.
- Rank 1: White streaks or black streaks are observed on the image, and the image is not usable.

<Evaluation of Cleaning Performance>

The lubricant application blade 1 of the first example that was made as described above was mounted on the process cartridge of the color multifunction peripheral (IMAGIO MP C4500 manufactured by Ricoh Co., Ltd.) so as to have a linear pressure of 0.5 N/m to 10 N/m.

Using the evaluation toner, the color multifunction peripheral (RICOH IM C6000) printed a chart (A4 size, lateral) having an image area rate of 0.5% with a vertical band on three sheets in one print job repeatedly until the total printed sheets exceeded 50000 sheets under the ordinary temperature environment (23 °C/55% RH). Then, the occurrence of black streaks on the image was evaluated.

The cleaning performance when the lubricant application blade 1 was used was evaluated by ranks each defined by the following evaluation criteria.

- Rank 4: No black streak is seen on the image.
- Rank 3: A black streak is slightly observed on the image but is within an allowable range.
- Rank 2: Black streaks are slightly observed on the image, and the number of the streaks is large, but the black streaks are within the allowable range.
- Rank 1: Black streaks are observed on the image, and the image is not usable.

The following describes a second example to a fifth example, a first comparative example, and a second comparative example.

In the second example to the fifth example, base layers 2 to 4 were manufactured as follows.

Each of the base layers 2 to 4 was produced in the same manner as in the base layer 1 except that the urethane rubber A as a material was changed to each of urethane rubbers B to D by changing the amount of ratio of the curing agent added to the base layer forming liquid.

The film thickness and the Martens hardness were measured in the same manner as in the base layer 1 as described above.

Measurement results were presented in Table 1.

Each of edge layers 1 to 7 was formed on the surface of the base layer described in Table 1 by the same procedure as in the production of the lubricant application blade 1 of the first example to make each of the lubricant application blades 2 to 7.

The Martens hardness of the edge layer was adjusted by changing the amount of ETHACURE 300 added to the edge layer forming liquid.

Using the lubricant application blades 2 to 7, the protective layer forming devices of the second example to the fifth example, and the first comparative example to the second comparative example were prepared, and experiments to evaluate the protective layer forming devices were performed in the same manner as in the first example.

A third comparative example is described below.

The edge layer was made from PLACCEL 220 (manufactured by Daicel (U.S.A.), Inc.) instead of TAKENATE L 2360 and 1,4-butanediol (BD) and trimethylolpropane (TMP) instead of ETHACURE 300, and the sheet made of polyurethane elastomer was formed on the surface of the base layer 1 by the centrifugal molding method so as to have a Martens hardness of 1.0 $N/mm^2$. Other than above, a lubricant application blade 8 was manufactured under conditions described in Table 1 in the same manner as in the first example. Using the lubricant application blade 8, the protective layer forming device of the third comparative example was prepared, and experiments to evaluate the protective layer forming devices were performed in the same manner as in the first example.

Regarding the lubricant application blades of the second example to the fifth example and the first comparative example to the third comparative example, the normalized ionic strength A of the protective layer, the cleaning performance, and the application performance were evaluated in the same manner as in the first example. The evaluation results are illustrated in Table 1.

TABLE 1

| Examples/Comparative examples | | | First example | Second example | Third example | Fourth example |
|---|---|---|---|---|---|---|
| Lubricant application blade No. | | | Lubricant application blade 1 | Lubricant application blade 2 | Lubricant application blade 3 | Lubricant application blade 4 |
| Lubricant application blade | Edge layer | Edge layer No. | Edge layer 1 | Edge layer 2 | Edge layer 3 | Edge layer 4 |
| | | Polyol | PTMG | PTMG | PTMG | PTMG |
| | | Isocyanate | TDI | TDI | TDI | TDI |
| | | Curing Agent | DMTDA | DMTDA | DMTDA | DMTDA |
| | | Film thickness [mm] | 0.5 | 0.5 | 0.5 | 0.5 |
| | | Martens Hardness [N/mm$^2$] | 5.0 | 8.0 | 10.0 | 12.0 |
| | Base Layer | Base layer No. | Base layer 1 | Base layer 2 | Base layer 1 | Base layer 3 |
| | | Material | Urethane Rubber A | Urethane Rubber B | Urethane Rubber A | Urethane Rubber C |
| | | Film thickness [mm] | 0.7 | 0.7 | 0.7 | 0.7 |
| | | Martens Hardness [N/mm$^2$] | 0.6 | 2.0 | 0.6 | 1.5 |
| | Edge Angle (°) | | 90 | 90 | 110 | 125 |
| | Contact linear pressure (to image bearer) | | 0.5 | 2.0 | 4.0 | 6.0 |
| Evaluation Results | Ionic strength A of protective layer [×E$^{-4}$] | | 20.0 | 10.0 | 7.0 | 5.0 |
| | Rank of black streak due to cleaning failure | | 3 | 4 | 4 | 4 |
| | Rank of white streak due to lubricant application failure | | 3 | 3 | 4 | 4 |

| Examples/Comparative examples | | | Fifth example | First comparative example | Second comparative example | Third comparative example |
|---|---|---|---|---|---|---|
| Lubricant application blade No. | | | Lubricant application blade 5 | Lubricant application blade 6 | Lubricant application blade 7 | Lubricant application blade 8 |
| Lubricant application blade | Edge layer | Edge layer No. | Edge layer 5 | Edge layer 6 | Edge layer 7 | Edge layer 8 |
| | | Polyol | PTMG | PTMG | PTMG | PCL |
| | | Isocyanate | TDI | TDI | TDI | TDI |
| | | Curing Agent | DMTDA | DMTDA | DMTDA | BD/TMP |
| | | Film thickness [mm] | 0.5 | 0.5 | 0.5 | 0.5 |
| | | Martens Hardness [N/mm$^2$] | 20 | 2.0 | 40.0 | 5.0 |
| | Base Layer | Base layer No. | Base layer 4 | Base layer 2 | Base layer 1 | Base layer 1 |
| | | Material | Urethane Rubber D | Urethane Rubber B | Urethane Rubber A | Urethane Rubber A |
| | | Film thickness [mm] | 0.7 | 0.7 | 0.7 | 0.7 |
| | | Martens Hardness [N/mm$^2$] | 1.0 | 2.0 | 0.6 | 0.6 |
| | Edge Angle (°) | | 140 | 90 | 90 | 135 |
| | Contact linear pressure (to image bearer) | | 8.0 | 3.0 | 5.0 | 8.0 |

TABLE 1-continued

| | | | | | |
|---|---|---|---|---|---|
| Evaluation Results | Ionic strength A of protective layer [$\times E^{-4}$] | 2.0 | 25.0 | 1.0 | 10.0 |
| | Rank of black streak due to cleaning failure | 3 | 3 | 1 | 1 |
| | Rank of white streak due to lubricant application failure | 4 | 1 | 2 | 1 |

In the first comparative example, the protective layer was formed non-uniformly in the longitudinal direction because the Martens hardness of the edge layer is low. This causes the white streak on the image.

In the second comparative example, the edge of the edge layer with an excessively hard Martens hardness was abraded at an early stage, which generates a portion that cannot apply the lubricant and cannot form the protective layer. This causes the cleaning failure that causes the black streak on the image.

In the third comparative example, since using polyol as the curing agent excessively increase the Martens hardness, the edge of the lubricant application blade was chipped at an early stage, which generates a portion that cannot apply the lubricant and cannot form the protective layer. This causes the cleaning failure that causes the black streak and the white streak on the image.

From these results, it is understood that the lubricant application blade for uniformly forming the thin protective layer on the image bearer preferably includes the contact portion made of the polyurethane elastomer containing the polytetramethylene ether glycol and the reaction product of the aromatic isocyanate and the amine, and the contact portion preferably has the Martens hardness of 5.0 N/mm$^2$ or more and 30.0 N/mm$^2$ or less. As a result, the protective layer that forms an image bearer protective layer having both of the image bearer protection performance and the cleaning performance over a long period of time is provided.

Aspects of the present disclosure are, for example, as follows.

<First Aspect>

In a first aspect, a protective layer forming device uses a lubricant application blade contacting a surface of an image bearer to apply lubricant to the surface of the image bearer and form a protective layer on the image bearer. The lubricant includes fatty acid metal salt. The lubricant application blade has a contact portion contacting the image bearer, and the contact portion includes polyurethane elastomer that includes a reaction product of polytetramethylene ether glycol, aromatic isocyanate, and amine. The contact portion has a Martens hardness of 5.0 N/mm$^2$ or more and 30.0 N/mm$^2$ or less. The fatty acid metal salt is applied to the surface of the image bearer so that a normalized ionic strength A of a metal ion amount derived from the fatty acid metal salt measured by a time-of-flight secondary ion mass spectrometer satisfies the following expression (1).

$$1E-4 < A < 20E-4 \tag{1}$$

<Second Aspect>

In a second aspect, the lubricant application blade in the protective layer forming device according to the first aspect has a laminated structure including two or more layers that include at least an edge layer and a base layer.

<Third Aspect>

In a third aspect, the lubricant application blade in the protective layer forming device according to the first aspect or the second aspect has a leading edge line portion having an edge angle that is 90° or more and 140° or less.

<Fourth Aspect>

In a fourth aspect, the lubricant application blade according to any one of the first to third aspects includes a base layer made of polyurethane elastomer and having a Martens hardness from 0.5 N/mm$^2$ to 2.0 N/mm$^2$ and an edge layer on the base layer. The edge layer has the contact portion contacting the surface of the image bearer.

<Fifth Aspect>

In a fifth aspect, the lubricant application blade in the protective layer forming device according to any one of the first to fourth aspects is pressed against the image bearer at a contact linear pressure of 0.5 N/m or more and 10.0 N/m or less.

<Sixth Aspect>

In a sixth aspect, an image forming apparatus includes an image bearer, the protective layer forming device according to any one of the first to fifth aspects, an irradiator to irradiate the surface charged by a charger with light to form an electrostatic latent image, a developing device to develop the electrostatic latent image and form a toner image, a transferor to transfer the toner image onto a recording medium, a fixing device to fix the toner image onto the recording medium, and a remover to remove toner remaining on the image bearer.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A protective layer forming device comprising:

lubricant including fatty acid metal salt; and a lubricant application blade, including a contact portion contacting a surface of an image bearer, to apply the lubricant on the surface of the image bearer, wherein the contact portion includes polyurethane elastomer that includes a reaction product of polytetramethylene ether glycol, aromatic isocyanate, and amine, the contact portion has a Martens hardness of 5.0 N/mm$^2$ or more and 30.0 N/mm$^2$ or less, and the lubricant applied to the surface of the image bearer by the lubricant application blade has a normalized ionic strength A of a metal ion amount derived from the fatty acid metal salt, satisfying a following expression (1), $$1E-4 < A < 20E-4, \quad (1)$$

where the normalized ionic strength A is measured by a time-of-flight secondary ion mass spectrometer.

2. The protective layer forming device according to claim 1, wherein the lubricant application blade has a laminated structure including two or more layers including:

an edge layer; and a base layer.

3. The protective layer forming device according to claim 1, wherein the lubricant application blade has a leading ridge having an edge angle of 90° or more and 140° or less.

4. The protective layer forming device according to claim 1, wherein the lubricant application blade includes:

a base layer made of polyurethane elastomer and having a Martens hardness from 0.5 N/$mm^2$ to 2.0 N/$mm^2$; and an edge layer disposed on the base layer and having the contact portion contacting the surface of the image bearer.

5. The protective layer forming device according to claim 1, wherein the lubricant application blade is pressed against the image bearer at a contact linear pressure of 0.5 N/m or more and 10.0 N/m or less.

6. An image forming apparatus comprising:

an image bearer; and the protective layer forming device according to claim 1.

7. The protective layer forming device according to claim 2, wherein the lubricant application blade has a leading ridge having an edge angle of 90° or more and 140° or less.

8. The protective layer forming device according to claim 2, wherein the lubricant application blade includes:

a base layer made of polyurethane elastomer and having a Martens hardness from 0.5 N/$mm^2$ to 2.0 N/$mm^2$; and an edge layer disposed on the base layer and having the contact portion contacting the surface of the image bearer.

9. The protective layer forming device according to claim 2, wherein the lubricant application blade is pressed against the image bearer at a contact linear pressure of 0.5 N/m or more and 10.0 N/m or less.

10. The protective layer forming device according to claim 3, wherein the lubricant application blade includes:

a base layer made of polyurethane elastomer and having a Martens hardness from 0.5 N/$mm^2$ to 2.0 N/$mm^2$; and an edge layer disposed on the base layer and having the contact portion contacting the surface of the image bearer.

11. The protective layer forming device according to claim 3, wherein the lubricant application blade is pressed against the image bearer at a contact linear pressure of 0.5 N/m or more and 10.0 N/m or less.

12. The protective layer forming device according to claim 4, wherein the lubricant application blade is pressed against the image bearer at a contact linear pressure of 0.5 N/m or more and 10.0 N/m or less.

13. The protective layer forming device according to claim 7, wherein the lubricant application blade includes:

a base layer made of polyurethane elastomer and having a Martens hardness from 0.5 N/$mm^2$ to 2.0 N/$mm^2$; and an edge layer disposed on the base layer and having the contact portion contacting the surface of the image bearer.

14. The protective layer forming device according to claim 7, wherein the lubricant application blade is pressed against the image bearer at a contact linear pressure of 0.5 N/m or more and 10.0 N/m or less.

15. The protective layer forming device according to claim 8, wherein the lubricant application blade is pressed against the image bearer at a contact linear pressure of 0.5 N/m or more and 10.0 N/m or less.

16. The protective layer forming device according to claim 10, wherein the lubricant application blade is pressed against the image bearer at a contact linear pressure of 0.5 N/m or more and 10.0 N/m or less.

17. The protective layer forming device according to claim 13, wherein the lubricant application blade is pressed against the image bearer at a contact linear pressure of 0.5 N/m or more and 10.0 N/m or less.

* * * * *